US008797323B2

(12) United States Patent
Salvi et al.

(10) Patent No.: US 8,797,323 B2
(45) Date of Patent: Aug. 5, 2014

(54) SHADOWING DYNAMIC VOLUMETRIC MEDIA

(75) Inventors: Marco Salvi, San Francisco, CA (US);
Aaron Lefohn, Bothell, WA (US);
Andrew T. Lauritzen, Victoria (CA);
Kiril Vidimce, Saint Pete Beach, FL (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 13/008,437

(22) Filed: Jan. 18, 2011

(65) Prior Publication Data
US 2012/0182300 A1   Jul. 19, 2012

(51) Int. Cl.
*G06T 15/50* (2011.01)

(52) U.S. Cl.
USPC .......................................................... 345/426

(58) Field of Classification Search
USPC .......................................................... 345/426
See application file for complete search history.

(56) References Cited

U.S. PATENT DOCUMENTS

| 6,760,024 | B1 * | 7/2004 | Lokovic et al. | 345/421 |
|---|---|---|---|---|
| 6,812,925 | B1 * | 11/2004 | Krishnan et al. | 345/423 |
| 7,940,269 | B2 * | 5/2011 | Zhou et al. | 345/426 |
| 8,009,168 | B2 * | 8/2011 | Zhou et al. | 345/426 |
| 2004/0160441 | A1 * | 8/2004 | Lokovic et al. | 345/426 |
| 2004/0263511 | A1 * | 12/2004 | West et al. | 345/421 |
| 2006/0119600 | A1 * | 6/2006 | Lokovic et al. | 345/426 |
| 2006/0215923 | A1 * | 9/2006 | Beatty | 382/253 |
| 2007/0024624 | A1 * | 2/2007 | Poppen | 345/441 |
| 2009/0040229 | A1 * | 2/2009 | Stitt et al. | 345/441 |
| 2009/0096803 | A1 * | 4/2009 | Tartaglia et al. | 345/589 |
| 2010/0085360 | A1 * | 4/2010 | Ren et al. | 345/426 |

OTHER PUBLICATIONS

Marco Salviy, Kiril Vidimce, Andrew Lauritzen and Aaron Lefohn, "Adaptive Volumetric Shadow Maps", Eurographics Symposium on Rendering 2010.*
Lokovic T., Veach E, "Deep shadow maps", In Proceedings of ACM SIGGRAPH 2000 (Jul. 2000), Computer Graphics Proceedings, ACS, pp. 385-392. 2, 3.*
Mertens T., Kautz J., Bekaert P., Van Reeth F. "A self-shadowing algorityhm for dynamic hair using clustered densities". In Rendering Techniques 2004: Eurographics Symposium on Rendering (Sweden, Jun. 2004), Eurographics / ACM SIGGRAPH Symposium Proceedings, Eurographics. 2.*
Hadwiger, M., Kratz, A., Sigg, C., and Buhler, K."Gpu-accelerated deep shadow maps for direct volume rendering". In GH '06: Proceedings of the 21st ACM SIGGRAPH/Eurographics symposium on Graphics hardware, ACM, New York, NY, USA, 2006, 49-52.*

(Continued)

*Primary Examiner* — Javid A Amini
*Assistant Examiner* — Jin Ge
(74) *Attorney, Agent, or Firm* — Trop, Pruner & Hu, P.C.

(57) ABSTRACT

A dynamic volumetric medium, such as hair, fog, or smoke, may be represented, for purposes of shadow mapping, by transmittance versus depth data for that medium. In one embodiment, the representation may take the form of a plot of transmittance versus depth, with nodes where the transmittance changes non-live linearly with respect of depth into the medium. The number of nodes in the representation may be reduced to reduce memory footprint and to enable the storage of the representation on the same chip doing the shadow mapping. In some embodiments, the number of nodes may be reduced, one node at a time, by removing the node whose underlying trapezoid has the least area of all the remaining nodes.

19 Claims, 3 Drawing Sheets

(56) References Cited

OTHER PUBLICATIONS

Erik Sinton, Ulf Assarsson, "Hair Self Shadowing and Transparency Depth Ordering Using Occupancy maps", Proceedings of the 2009 symposium on Interactive 3D graphics and games pp. 67-74.*

Sintorn, E., and Assarsson, U. 2008. Real-time approximate sorting for self shadowing and transparency in hair rendering. In SI3D '08: Proceedings of the 2008 symposium on Interactive 3D graphics and games, ACM, New York, NY, USA, 157-162.*

Emmett Kigariff and Randima Freando, "GPU Gems2 Chapter 30: The GeForce 6 Dearies GPU Architecture", 2005.*

Agarwal P. K., Varadarajan K. R.: Efficient algorithms for approximating polygonal chains. Discrete and Computational Geometry 23, 2 (2000), 273-291. 3.*

Bose P., Cabello S., Cheong O., Gudmundsson J., Van Kreveld M., Speckmann B., "Area-preserving approximations of polygonal paths". Journal of Discrete Algorithms 4, 4 (2006), 554-566. 3.*

T. T Deveau, Reducing the number of points in a plane curve representation, in: Proceedings on Auto-Carto, vol. VII, 1985, pp. 152-160.*

Ali Ukasha, Emhimed Saffor, Mohammed A. S. Hassan, "Contour Compression using Trapezoid method", Computer and Information Sciences, 2008. ISCIS '08. 23rd International Symposium on Oct. 27-29, 2008, p. 1-6.*

Ali Abdrhman Ukasha, "Arabic Letters Compression using New Algorithm of Trapezoid method", Proceeding ISPRA'10 Proceedings of the 9th WSEAS international conference on Signal processing, robotics and automation pp. 336-341.*

Ovidiu Daescu, Ningfang Mi, "Polygonal chain approximation: a query based approach", Computational Geometry 30 (2005) 41-58.*

Remigiusz Baran, Andrzej Dziech, "Comparison of Some Efficient Methods of Contour Compression", Proceeding ICCOMP'05 Proceedings of the 9th WSEAS International Conference on Computers Article No. 47.*

Timo Aila and Samuli Laine, "Alias-Free Shadow Maps", Eurographics Symposium on Rendering (2004).*

Hadwiger, M., Kratz, A., Sigg, C., and B-Uhler, K."Gpu-accelerated deep shadow maps for direct volume rendering". In GH '06: Proceedings of the 21st ACM SIGGRAPH/Eurographics symposium on Graphics hardware, ACM, New York, NY, USA, 2006, 49-52.*

Zhou, S. and Jones, C. B., 2004. Shape-Aware Line Generalisation With Weighted Effective Area. In: Developments in Spatial Data Handling 11th International Symposium on Spatial Data Handling, Springer, Springer, pp. 369-380.*

W. Shi and C.K. Cheung. "Performance evaluation of line simplification algorithms for vector generalization," The Cartographic Journal, vol. 43(1):27-44, 2006.*

Enderton E., Sintorn E., Shirley P., Lubke D.: Stochastic Tansparency. In I3D '10: Proceedings of the 2010 Symposium on Interactive 3D Graphics and Games (Feb. 2010), pp.157-164. 2.

Jansen J., Bavoil L.: Fourier Opactiy Mapping. In I3D '10: Proceedings of the 2010 Symposium on Interactive 3D Graphics and Games (Feb. 2010), pp. 165-172. 2.

Kelley M., Gould K., Pease B., Winner S., Yen A.: Hardware Accelerated Rendering of CSG and Transparency. In SIGGRAPH '94: Proceedings of the 21st Annual Conference on Computer Graphics and Interactive Techniques (New York, NY, USA, 1994), ACM, pp. 177-184. 2.

Kim T.-Y., Neumann U.: Opacity Shadow Maps. In Rendering Techniques 2001: 12th Eurographics Workshop on Rendering (Jun. 2001), pp. 177-182, 2.

Kniss J., Premoze S., Hansen C., Shirley P. S., McPherson A.: A Model for Volume Lighting and Modeling. IEEE Transactions on Visualization and Computer Graphics 9, 2 (Apr./Jun. 2003), pp. 150-162. 2.

Lokovic T., Veach E.: Deep Shadow Maps. In Proceedings of ACM SIGGRAPH 2000 (Jul. 2000), Computer Graphics Proceedings, ACS. pp. 385-392. 2, 3.

Mertens T., Kautz J., Bekaert P., Van Reeth F.: A Self-Shadow Algorithm for Dynamic Hair using Density Clustering. In rendering Techniques 2004: Eurographics Symposium on Rendering (Sweden, Jun. 2004), Eurographics/ACM SIGGRAPH Symposium Proceedings, Eurographics. 2.

Sintorn E., Assarson U.: Hair Self Shadowing and Transparency Depth Ordering Using Occupancy Maps. In I3D '09: Proceedings of the 2009 Symposium on Interactive 3D Graphics and Games (Feb./Mar. 2009), pp. 67-74. 2.

Xie F., Tabellion E., Pearce A.: Soft Shadows by Ray Tracing Multilayer Transparent Shadow Maps. In Rendering Techniques 2007: 18th Eurographics Workshop on Rendering (Jun. 2007), pp. 265-276. 2.

Yuksel C., Keyser J.: Deep Opacity Maps. Computer Graphics Forum 27, 2 (Apr. 2008), pp. 675-680. 2.

Zhou K., Hou Q., Gong M., Snyder J., Guo B., Shum H.-Y.: Fogshop: Real-Time Design and Rendering of Inhomogeneous, Single-Scattering Media. In Proceedings of Pacific Graphics 2007 (Nov. 2007), pp. 116-125. 2.

Zhou K., Ren Z., Lin S., Bao H., Guo B., Shum H.-Y.: Real-Time Smoke Rendering Using Compensated Ray Marching. In SIGGRAPH '08: ACM SIGGRAPH 2008 papers (New York, NY, USA, 2008), ACM, pp. 1-12. 2.

* cited by examiner

SHADOWING DYNAMIC VOLUMETRIC MEDIA

BACKGROUND

This relates generally to graphics processing and particularly to shadowing dynamic volumetric media.

Dynamic volumetric media are objects that have variable volumes, variable light transmittance, and self-shadowing. Self-shadowing is the effect of an object that creates shadows within itself. Examples of dynamic volumetric media include hair and translucent media such as smoke, dust, glass and fog.

Realistic lighting of dynamic volumetric media adds significant richness and realism to rendered scenes. The self-shadowing created by dynamic volumetric media provides important visual cues that define the shape and structure of that media. Computing self-shadowing in dynamic volumetric media involves accumulating partial occlusion between visual points and light sources in a scene. Accumulating partial occlusion involves capturing the effect of all of the volumetric objects between two points and is generally much more expensive in terms of computing cycles than computing shadows generated by opaque surfaces.

DETAILED DESCRIPTION

Shadow maps may be created for dynamic volumetric media as part of the process of rasterization during graphics processing. The shadow maps may be used for example in connection with video games but the present invention is in no way limited to any particular application.

Approximate volumetric shadows can be computed for real-time applications such as games where predictable performance and a fixed, small memory footprint are desirable. Scattering effects may be ignored in some embodiments and an adaptively sampled representation of volumetric transmittance may be created. The adaptively sampled representation may include texels that store a compact representation of the transmittance curve along a corresponding light ray. The representation can capture and combine transmittance data from arbitrary dynamic occluders, including combining soft media like smoke and very localized and denser media like hair.

In some embodiments a lossy compression algorithm is capable of building a constant storage, variable error representation of visibility while the volume is rendered from the light's point of view. This algorithm may use a variable amount of memory proportional to the total number fragments generated during rasterization. Thus a software rendering pipeline amenable to using variable amounts of memory may overcome these limitations in streaming applications in some embodiments.

Adaptive volumetric shadow maps may encode the fraction of visible light from a light source over an interval as a function of the depth at each texel. This quantity, the transmittance, t, is defined as:

$$t(z)=e^{-\int_0^z f(x)dx} \quad (1)$$

where $f(x)$ is an attenuation function that represents the amount of light absorbed along a light ray.

Figure 2:
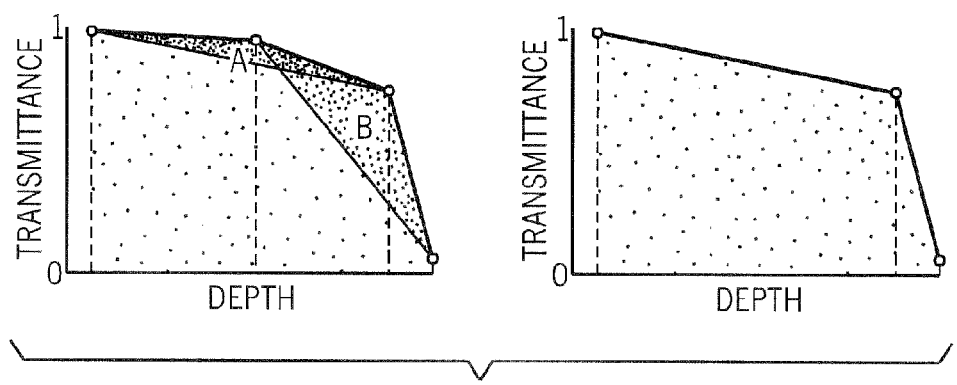
FIG. 2 is a depiction of the simplification of transmittance as a function of depth curves during shadow mapping according to one embodiment of the present invention.

Referring to FIG. 2, two plots of transmittance versus depth are depicted. The curve on the left shows a graph of transmittance as a function of depth and the curve on the right has been simplified to remove one node. Each node represents a discontinuity in the relationship between transmittance and depth. Two adjacent nodes define a linear segment in one embodiment. Thus the transmittance at each point within the depth of the object is graphed.

In one embodiment each texel stores a fixed size array of irregularly placed samples of the transmittance function in order to limit the amount of memory that must be used. Array elements, in the form of nodes of the approximation, are sorted from front to back along the ray. Each node stores a pair of depth and transmittance values $(d_i, t_i)$. Nodes are adaptively placed at depth and as a result can represent a rich variety of shadow blockers from soft and transmissive particles to sharp and opaque local occluders. The number of nodes stored per texel is a user-defined quantity in some embodiments, where two or more nodes may be stored per texel. Using more nodes allows for a better approximation of transmittance and higher-quality shadows, at the expense of increased storage and computational cost.

Shadow maps may be created by rendering the scene from the light's viewpoint. The shadow maps may handle both opaque objects and objects of variable thickness and density in some embodiments. Specifically, when a non-opaque occluder is rendered and inserted into the shadow map along a ray from the light, the entry and exit points as well as the density along that segment may be recorded as indicated in blocks 12 and 14 in FIG. 1. The transmittance may be integrated over the segment as shown in block 16. Then the integrated transmittance may be composited with transmittance values as indicated in block 18. For example, a segment representing a ray's traversal through a particle may be inserted. For hair, a short segment may be inserted where the light enters and exits the hair strand. For opaque blockers, a short, dense segment may be inserted that takes the transmittance to zero at the exit point.

In any nontrivial scene, the number of light blockers inserted may generate more nodes in the transmittance versus depth curve than it is possible to store in a shadow map texel. In these cases, an on-the-fly lossy compression of transmittance data may be performed to reduce the number of nodes to a maximum node count, which may be user definable, before proceeding with inserting new blockers or after inserting a new blocker and before storing the data back to memory. This procedure may involve many insertion-compression iterations, and so it is desirable to adapt a lossy compression algorithm that is computationally inexpensive while keeping the overall error as small as possible.

In some embodiments only two nodes are removed at a time, corresponding to a single segment insertion, so an algorithm is used that takes as its input an n node curve and generates an n minus one node curve, applying the algorithm repeatedly to remove the desired number of nodes to meet the user specification or a default value for the maximum number of nodes.

In streaming applications, the compression algorithm advantageously does not rearrange node positions. Over many insertion-compression iterations, nodes can drift unpredictably and perform random walks over the compression plane, leading to non-monotonic transmittance curves and introducing artifacts such as overly dark/bright shadows and temporal aliasing. Thus the shadow map algorithm compresses transmittance data simply by removing a node that contributes the least to the overall transmittance curve shape, and the algorithm does not modify node positions, in some embodiments.

Using an area preserving metric to decide which nodes to remove may result in a simple and computationally efficient compression code in some embodiments. Thus referring to FIG. 3, the node that has the least effect on the transmittance versus depth curve area is located as indicated in block 22. In the example of FIG. 2 the node that is removed is denoted A and it is removed because the area of the triangle under the node A is less than the area of the triangle under the node B.

Then the selected node is eliminated as indicated in block 24. A check at diamond 26 determines whether the number of nodes now equals the maximum number of nodes. If so, the transmittance versus depth curve is stored as indicated in block 28. Otherwise, the flow iterates until the number of nodes equals the maximum number of nodes.

In some embodiments area-based metrics are undefined for the first and last node of the curve. Compression may only be applied in internal nodes in some embodiments. This may be beneficial because these uncompressed nodes provide important visual cues such as transition into a volume or the shadows cast from a volume onto opaque surfaces.

Each node of the piecewise transmittance curve maps to an ordered sequence of pairs of depth, transmittance values that encode node depth along the light ray and its associated transmittance. Although transmittance varies exponentially between nodes, linear variation may be assumed in some embodiments to simplify area computations. This simplification allows writing the transmittance integral $I_t$ for and N node curve as the sum of N−1 trapezoidal areas:

$$I_t = \sum_{i=0}^{N-1} \frac{(d_{i+1} - d_i)(t_i + t_{i+1})}{2}$$

The removal of an internal ith node affects only the area of the two trapezoids that share the nodes. Since the rest of the curve is unaffected, the variation of its integral $\Delta t_i$ may be computed with a simple geometrically derived formula:

$$\Delta t_i = |(d_{i+1}-d_{i-1})(t_{i+1}-t_i)-(d_{i+1}-d_i)(t_{i+1}-t_{i-1})|$$

Figure 3:
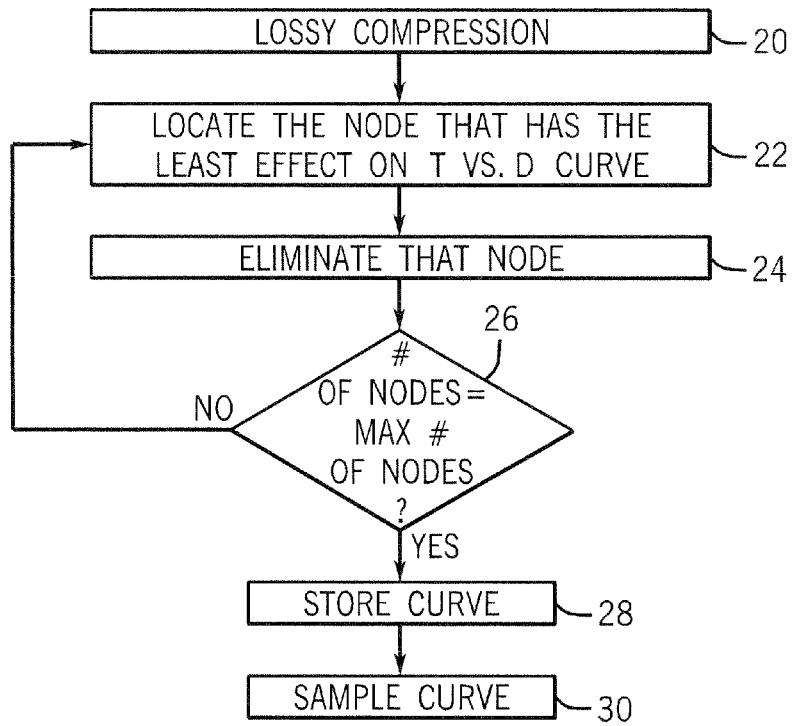
FIG. 3 is a flow chart for lossy compression according to one embodiment of the present invention.

Sampling the shadow maps, as indicated in FIG. 3 at block 30, is a generalization of a standard shadow map depth test to soft occluders. The transmittance function may be evaluated at the receiver depth and the process can be repeated over multiple texels, weighting the results according to a specific reconstruction filter in some embodiments.

In view of the irregular nature of the shadow map mapping, filtering may be implemented manually in the shader. For a given texel, a search may be performed over the domain of the curve, as stored, in order to find the two nodes that bound the shadow receiver of depth d, and then interpolating the bounding nodes' transmittance to intercept the shadow receiver.

In some embodiments, the space between nodes may be assumed to exhibit uniform density, which implies the transmittance varies exponentially between each depth interval (see equation 1) (although a linear interpolation may be faster and visually acceptable):

$$T(d) = t_l + (d - d_l)\frac{(t_r - t_l)}{(d_r - d_l)}$$

This procedure may be used as the basis for point filtering in some embodiments. Bilinear filtering is also straightforward: transmittance T(d) is evaluated over four neighboring texels and linearly weighted together.

The shadow mapping may be applied to streaming compression algorithms in some embodiments. Such an implementation may include support for read-modify-write frame buffer operation in the pixel shader. The ability to perform ordered read-modify-write operations is provided in DirectX 11 application program interfaces (APIs) on certain buffer types in the pixel shader. (DirectX 11 is a component of Microsoft Windows). However, the shadow mapping here may to ensure that each pixel's frame buffer memory is modified by only one fragment at a time, in some embodiments.

Because current shader compilers forbid per pixel locks, shadow mapping may be implemented in two different ways. Firstly, a variable memory version may use the current rendering pipeline such as the DIRECTX11 pipeline, by first capturing all fragments and then compressing. Secondly, a truly streaming shadow mapping implementation may use a software particle rasterization pipeline which may be written in DIRECTX 11 Compute-Shader, that supports read-modify-write operations. Other alternatives may also be possible in the present invention is not limited to particular techniques that avoid or use per pixel locks.

The uncompressed solution may include a linked list of light attenuating segments per pixel by using the DIRECTX11 support for atomic gather/scatter memory operations in pixel shaders. All linked lists may be stored in a single buffer, and typically a 20 MBytes buffer is sufficient, in some embodiments. A second pass converts a list of occluding segments at each pixel into a composited transmittance curve—either uncompressed or compressed with shadow mapping or deep shadow map compression algorithms.

The shadow maps may store the transmittance curve in an array of depth/transmittance pairs using two single-precision floating-point values in one embodiment. The entire compressed transmittance curve may fit in an on-chip memory during compression in some embodiments. Depth may be cleared to the far plane value, while transmittance is set to one in order to represent empty space. For example, the number of nodes may be limited to that number which will fit within the available storage within a graphics processing unit (GPU) also performing the rasterization of the dynamic volumetric medium.

Each occluding segment may be inserted by viewing it as a compositing operation between two transmittance curves, respectively representing the incoming blocker and the current transmittance curve. Given two light blockers A and B located along the same light ray, the density function $f_{AB}(x)$ may be written as the sum of the density functions $f_A(x)$ and $f_B(x)$. Applying equation 1, the total transmittance may be computed:

$$t_{tot}(z) = e^{-\int_0^Z f_{AB}(x)dx}$$
$$= e^{-\int_0^Z f_A(x)dx} e^{-\int_0^Z f_A(x)dx}$$
$$= t_A(Z)t_B(Z)$$

In the absence of lossy compression, the order of composition is not important in some embodiments. The equation above shows that the resulting total transmittance is given by the product of the two transmittance functions associated with each light blocker. Compression proceeds by removing one node at a time until the maximum node count is reached.

In practice, due to the lossy compression, the order in which the segments are inserted may affect the results. In particular, in a variable-memory implementation, the parallel execution of pixel shaders inserts segments into the linked list in an order that may vary per frame even if the scene and the view are static. Inconsistent ordering can result in visible temporal artifacts, although they are mostly imperceptible and unlikely to be observed when using eight or more nodes or when the volumetric media is moving quickly. In those rare cases when a consistent ordering cannot be preserved and the number of nodes is not sufficient to hide these artifacts, the captured segments may be sorted by depth via insertion sort before inserting them.

Determining the light transmittance at a receiver sample involves reconstructing the transmittance curve at its depth. The two nodes that bound the receiver depth may be located via a fast two-level search. Although this involves searching irregularly spaced nodes, the fact that the representation is stored in fixed size small arrays in some embodiments results in the memory accesses being coherent and local with no variable-length linked list traversals. In fact, the lookup can be implemented entirely with compile time (static) array indexing without dynamic branching, allowing the compiler to keep the entire transmittance curve on-chip, in the graphics processor unit (GPU) registers.

Figure 4:
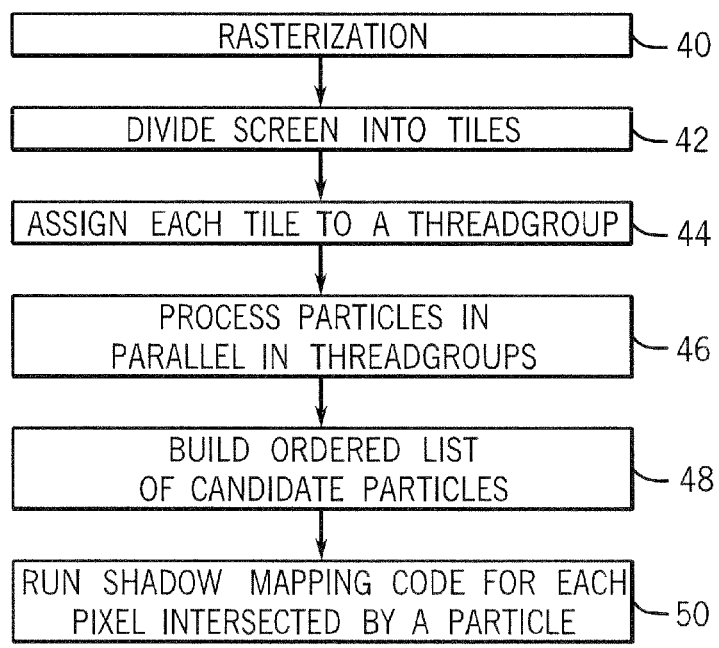
FIG. 4 is a flow chart for rasterization according to one embodiment of the present invention.

Ordered read-modify-write operations may be implemented on the frame buffer by building a software particle rendering pipeline, for example in a DIRECTX11 ComputeShader. Referring to FIG. 4, the screen may be divided into tiles, as indicated in block 42. Each tile may be assigned to ComputeShader threadgroup, as indicated in block 44. Each threadgroup processes the entire particle set in parallel, building a list of candidate particles that intersect the tile, ordered by primitive identifier, as shown in block 48. The ComputeShader, now parallelizing over pixels instead of particles, runs the shader insertion code for each pixel intersected by a particle, as indicated in block 50. The correct frame buffer update ordering may be enforced by mapping each pixel to a single ComputeShader thread, which may correspond to a single instruction multiple data (SIMD) lane in one embodiment.

In some embodiments, performance improvements may be the result of the use of a streaming compression algorithm that permits direct construction of a compressed transmittance representation without first building the full uncompressed transmittance curve. In addition the use of a small fixed number of nodes such that the entire representation fits into on-chip memory may improve performance in some embodiments. A high-level of performance may be achieved using the curve simplification compression algorithm that supports directly building the compression transmittance function on-the-fly while rendering, in some embodiments. By constraining the compressed curves to use a fixed number of nodes, the curves can stay in on-chip memory during compression, in some embodiments.

Figure 5:
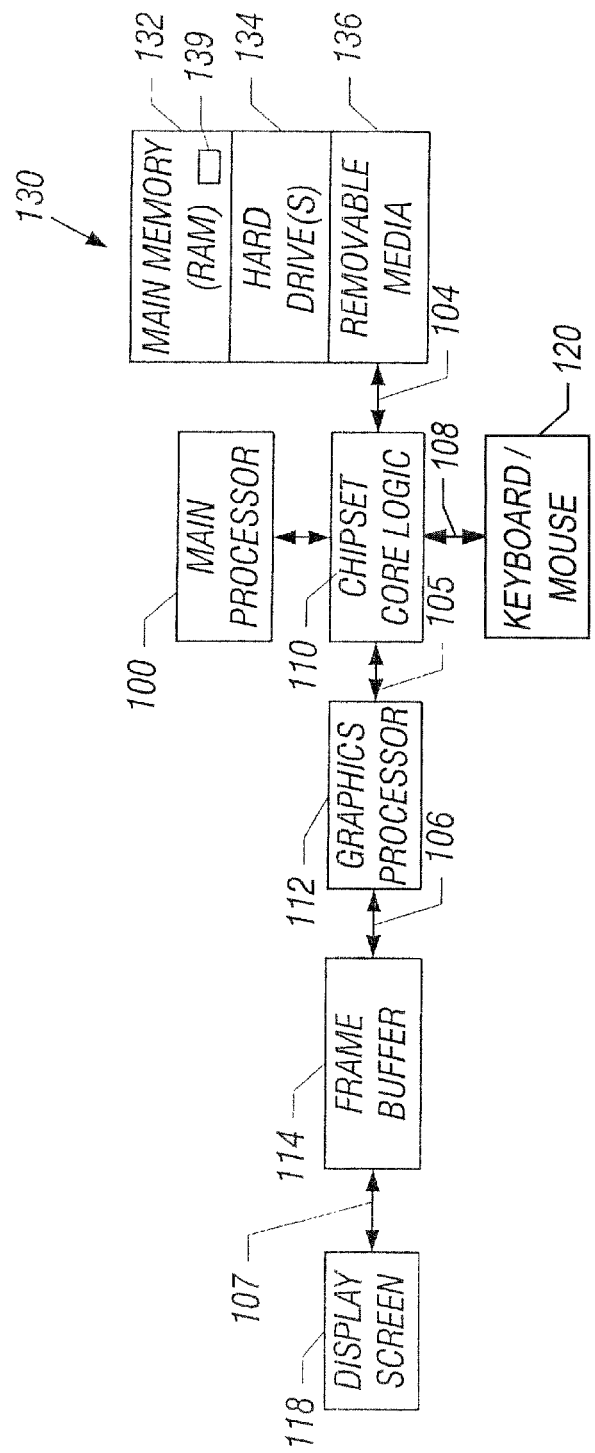
FIG. 5 is a hardware depiction for one embodiment of the present invention.

The computer system 130, shown in FIG. 5, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIGS. 1, 3 and 4 may be stored in a non-transitory machine or computer readable medium, such as the memory 132, as indicated at 139, or the graphics processor 112, and may be executed by the processor 100 or the graphics processor 112 in one embodiment.

Figure 1:
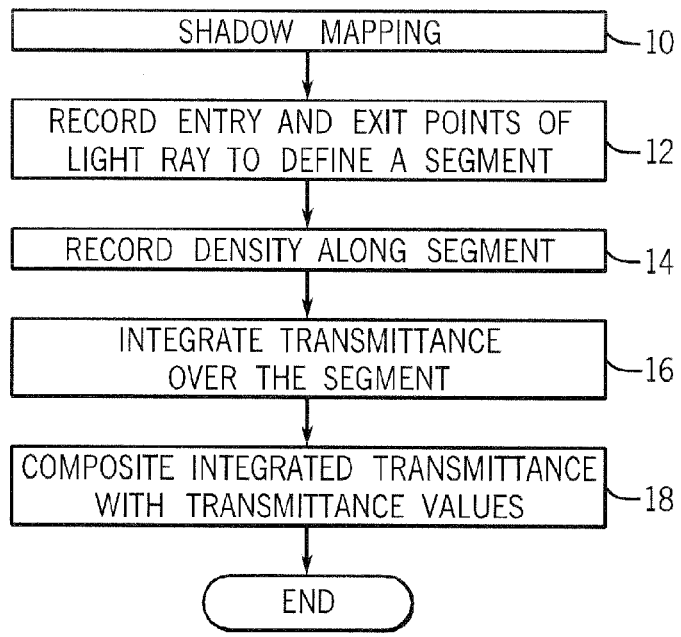
FIG. 1 is a flow chart for one embodiment of the present invention.

FIGS. 1, 3 and 4 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in those few charts.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

The invention claimed is:

1. A computerized method comprising:
recording entry and exit points of a light ray to define a segment;
recording density along segment;
integrating transmittance over the segment;
compositing integrated transmittance with transmittance values;
shadow mapping a dynamic volumetric medium by reducing a number of nodes in a representation of transmittance as a function of depth for that medium by selecting nodes to remove using a computer;
identifying intermediate nodes, wherein said intermediate nodes being positioned along said segment intermediate between the beginning and end of the segment;
removing intermediate nodes one at a time by selecting in each iteration the intermediate node having a triangle under the intermediate node with the least area of all the remaining intermediate nodes, wherein the triangle of the intermediate node is constructed by the nearest two connected nodes of the intermediate node; and
continuing to eliminate nodes until the number of nodes is below the threshold, wherein the threshold is less than the maximum number of nodes.

2. The method of claim 1 including developing a representation of said medium in the form of the transmittance as a function of depth through the medium.

3. The method of claim 1 including limiting the number of nodes per medium.

4. The method of claim 3 including limiting the number of nodes such that the representation may be stored in a graphics processor doing the shadow mapping.

5. The method of claim 1 including removing nodes one of the time by selecting in each iteration the node having a triangle under the node with the least area of all the remaining nodes.

6. The method of claim 1 including developing a compressed shadow map without first developing an uncompressed shadow map.

7. A non-transitory computer readable medium storing instructions to perform a sequence comprising:
recording entry and exit points of a light ray to define a segment;
recording density along segment;
integrating transmittance over the segment;
compositing integrated transmittance with transmittance values;
shadow mapping a dynamic volumetric medium by reducing a number of nodes in a representation of transmittance as a function of depth for that medium by selecting notes to remove based on the area of a triangle under each node;
identifying intermediate nodes, wherein said intermediate nodes being positioned along said segment intermediate between the beginning and end of the segment;
removing intermediate nodes one at a time by selecting in each iteration the intermediate node having a triangle under the intermediate node with the least area of all the remaining intermediate nodes, wherein the triangle of the intermediate node is constructed by the nearest two connected nodes of the intermediate node; and
continuing to eliminate nodes until the number of nodes is below the threshold, wherein the threshold is less than the maximum number of nodes.

8. The medium of claim 7 further storing instructions to develop a representation of said medium in the form of the transmittance as a function of depth through the medium.

9. The medium of claim 7 further storing instructions to limit the number of nodes per medium.

10. The medium of claim 9 further storing instructions to limit the number of nodes such that the representation may be stored in a graphics processor doing the shadow mapping.

11. The medium of claim 7 further storing instructions to select nodes to remove based on the area of a trapezoid under each node.

12. The medium of claim 11 further storing instructions to remove nodes one of the time by selecting in each iteration the node having a trapezoid under the node with the least area of all the remaining nodes.

13. The medium of claim 7 further storing instructions to develop a compressed shadow map without first developing an uncompressed shadow map.

14. An apparatus comprising:
a processor to record entry and exit points of a light ray to define a segment, record density along segment, integrate transmittance over the segment, composite integrated transmittance with transmittance values, shadow map a dynamic volumetric medium by reducing a number of nodes in a representation of transmittance as a function of depth for that medium by selecting nodes to remove based on the area of a triangle under each node, identify intermediate nodes, wherein said intermediate nodes being positioned along said segment intermediate between the beginning and end of the segment, remove intermediate nodes one at a time by selecting in each iteration the intermediate node having a triangle under the intermediate node with the least area of all the remaining intermediate nodes, wherein the triangle of the intermediate node is constructed by the nearest two connected nodes of the intermediate node, and continue to eliminate nodes until the number of nodes is below the threshold, wherein the threshold is less than the maximum number of nodes; and
a storage coupled to said processor.

15. The apparatus of claim 14 wherein said processor is a graphics processing unit.

16. The apparatus of claim 15 wherein said processor is a single instruction multiple data processor.

17. The apparatus of claim 14, said processor to limit the number of nodes per medium.

18. The apparatus of claim 17, said processor to limit the number of nodes such that the representation may be stored in said graphics processor.

19. The apparatus of claim 14, said processor to remove nodes based on the area of a trapezoid under each node.

* * * * *